(12) United States Patent
Adair et al.

(10) Patent No.: US 6,618,024 B1
(45) Date of Patent: Sep. 9, 2003

(54) HOLOGRAPHIC LABEL WITH A RADIO FREQUENCY TRANSPONDER

(75) Inventors: Paul C. Adair, Germantown, WI (US); Amy J. Jessen, Hartland, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 10/103,616

(22) Filed: Mar. 21, 2002

(51) Int. Cl.⁷ .................................................. L03H 1/00
(52) U.S. Cl. ............................. 343/895; 359/2; 235/451
(58) Field of Search .......................... 343/895; 359/2; 235/451, 380, 457, 492; 340/825.34; 342/51

(56) References Cited

U.S. PATENT DOCUMENTS

| | | | |
|---|---|---|---|
| 4,915,464 A | 4/1990 | Hopwood | 350/3.69 |
| 5,122,905 A | 6/1992 | Wheatley et al. | 359/586 |
| 5,278,694 A | 1/1994 | Wheatley et al. | 359/359 |
| 5,339,198 A | 8/1994 | Wheatly et al. | 359/359 |
| 5,448,404 A | 9/1995 | Schrenk et al. | 359/584 |
| 5,552,927 A | 9/1996 | Wheatly et al. | 359/359 |
| 5,568,316 A | 10/1996 | Schrenk et al. | 359/584 |
| 5,757,521 A * | 5/1998 | Walters et al. | 359/2 |

\* cited by examiner

*Primary Examiner*—James Clinger
(74) *Attorney, Agent, or Firm*—George E. Haas; Quarles & Brady LLP

(57) ABSTRACT

A label for identifying an object includes a radio frequency transponder and a hologram. The radio frequency transponder has an antenna and a transponder circuit sandwiched between two layers of material which form exterior surfaces of the transponder. The hologram comprises a first layer of non-metallic material applied to one of the exterior surfaces and forming a non-metallic reflector of light. A generally transparent second layer contains a holographic image and extends across the first layer. Because the reflective first layer is made of a non-metallic material, its close proximity to the radio frequency transponder does not detune the transponder as may occur when metallic holograms are placed in close proximity to the transponder. Thus the hologram provides a deterrent to unauthorized use of the label without affecting the operation of the radio frequency transponder.

20 Claims, 1 Drawing Sheet

HOLOGRAPHIC LABEL WITH A RADIO FREQUENCY TRANSPONDER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to labels and tags that incorporate a transponder which responds to a radio frequency interrogation signal by identifying an object to which the label is attached, and more particularly to such labels which also include a holographic image or a metallic appearing exterior surface.

2. Description of the Related Art

Radio frequency transponders have been employed to identify objects of various types. For example, identification labels are often placed on items being produced on an assembly line or on airline baggage being sorted at an airport. In another application, such labels are affixed to merchandise in a retail store to detect when a thief attempts to take the merchandise from the premise without paying for it.

It is common to incorporate a radio frequency identification (RFID) transponder circuit into a laminated label which is to be adhered to the object. Many of these transponders employ an integrated circuit which is programmable with information regarding the particular object to which the label is attached. For example, the label for an assembly line can be encoded to identify the particular product model or the features to be incorporated into a specific product being assembled such as the options of a given automobile. For airline baggage, the integrated circuit may store data designating the airline flight number and airport gate, thereby identifying which airplane is to carry a particular luggage item. In a retail store, the label can be encoded at a cash register to indicate that payment has been received for the associated merchandise so that when the merchandise is carried outside, sensors will not sound an alarm.

When the transponder label is placed onto the object, a data encoding device transmits the relevant information to the label via a radio frequency signal. An antenna on the label receives the radio frequency signal which then is detected by the integrated circuit and stored in a memory. Some labels are passive devices in that they are powered by energy from the received radio frequency signal and do not have a battery.

Subsequently, as the object passes down the assembly line or baggage sorting equipment for example, a label reader sends a radio frequency interrogation signal to the label. The label responds to the interrogation signal by reading the previously stored information from memory and transmitting the information via another radio frequency signal. The label reader receives that signal from the label and decodes the transmitted identification information. This enables the specific information about the object to which the label is attached to be obtained by material handling equipment at remote locations from where the label was placed onto the object.

In order for the label to be encoded with information and then be subsequently interrogated, the circuitry on the label must respond to the proper radio frequency used to communicate with the label. However, a problem has been encountered when an RFID label is placed on or near a metal object. The presence of metal in close proximity to the label decreases the inductance and increases the resonant frequency to which the label circuitry is tuned. The resonant frequency often is shifted so far that the label no longer responds to the writing and reading radio frequency signals. One solution to this detuning problem was to place a non-conductive spacer between the label and the metal object. A typical spacer is 6.5 millimeters thick and thus causes the label to stand away from the object far enough so that the metal does not significantly affect the transponder tuning. Although the separation provided by the spacer solves the RF detuning problem, it makes the label considerably thicker and prone to being torn off the object or otherwise damaged during handling. Where the label is to be permanently applied to the object, the relatively bulky size of the label due to the thickness of the spacer often detracts from the appearance of the object.

The present applicants desire to place a reflective holographic image on the label to provide a pleasing appearance. The hologram also makes counterfeiting the label more difficult.

However, heretofore reflective holograms included a metallic layer which reflected light. The metal in that layer interferes with operation of the radio frequency identification transponder by detuning its circuitry from the nominal resonant frequency. Employing the conventional solution would place a relatively thick spacer layer between the RF circuitry and the hologram. However, this produces a label that may be too thick for many applications and which suffers from the disadvantages described previously.

SUMMARY OF THE INVENTION

A label for identifying an object includes a radio frequency transponder covered by a non-metallic reflective film, which may form part of a hologram. The radio frequency transponder has an antenna and a transponder circuit attached to an electrically non-conductive layer of material which forms an exterior surface of the label. The hologram forms the other exterior surface of the label with the radio frequency transponder sandwiched between the non-conductive layer and the hologram.

The hologram incorporates the non-metallic reflective film that is adjacent the radio frequency transponder. This film forms a non-metallic reflector of light. A generally transparent image layer contains a transparent holographic image and extends across the non-metallic reflective film. Ambient light passing through the image layer is reflected outward by the film so that an observer can view the holographic image.

Because the reflective film is made of a non-metallic material, its close proximity to the radio frequency transponder does not detune the transponder. This eliminates a need to space the hologram a significant distance from the transponder circuitry, thereby enabling the entire label to have a relatively thin profile.

DETAILED DESCRIPTION OF THE INVENTION

Figure 1:
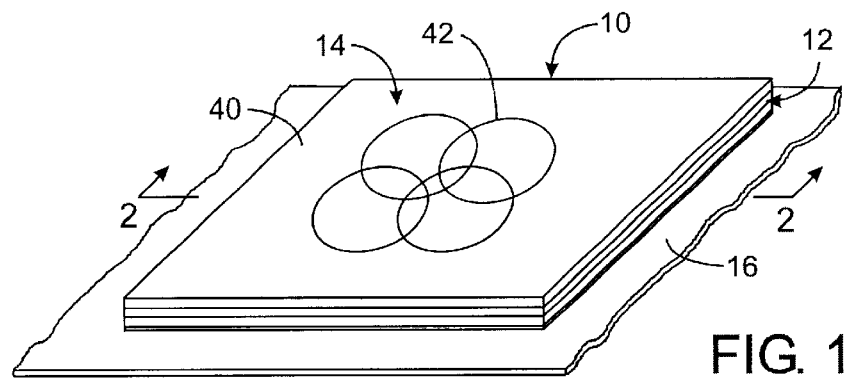
FIG. 1 is an isometric view of a radio frequency identification label on a backing material prior to placement on an object to be identified.

With initial reference to FIG. 1, a radio frequency identification (RFID) label 10 comprises a multiple layer laminated structure forming a radio frequency transponder 12 and a hologram 14 that is attached to the transponder. Although the exemplary label 10 described herein has a rectangular shape, the radio frequency transponder and hologram may have any shape without departing from the scope of the present invention.

The label 10 is shown adhered to a release liner 16 from which it may be peeled off and then applied to an object that is to be identified. The release liner 16 preferably is a silicone coated paper to which the label is adhered by a layer 18 of adhesive. However, any liner having releasable properties may be used.

Figure 2:
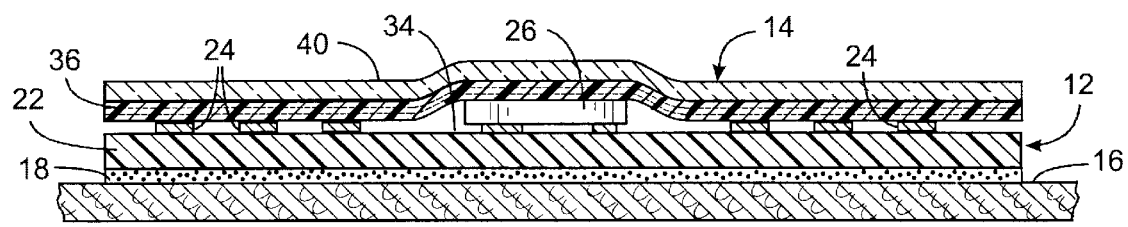
FIG. 2 is a cross-sectional view taken along line 2—2 in the FIG. 1.

With reference to FIG. 2, the adhesive layer 18 may be a ultraviolet curable pressure sensitive adhesive, such as type ML 25251 available from Acheson Colloids Company, Port Huron, Mich., U.S.A. This layer 18 provides an adhesive surface which enables the finished label 10 to adhere to the object to be identified. However other types of adhesives commonly employed to attach labels in non-removable and removable manners may used. In addition, other mechanisms may be used to attach the label to the object to be identified. For example, a band, strap. chain, string or similar device may be utilized.

Figure 3:
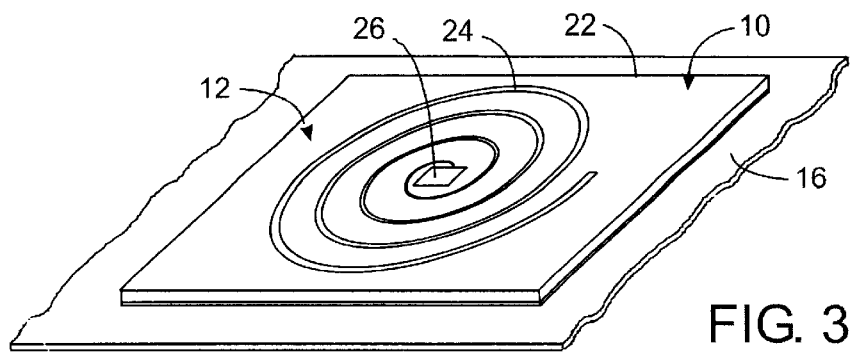
FIG. 3 is an isometric view of the label with several top layers removed to expose circuitry of the radio frequency transponder.

The adhesive layer 18 is applied to an inlay layer 22 comprising a sheet of an electrically non-conductive material on which the radio frequency transponder circuit is formed. For example, the inlay layer 22 may be formed of polyethyleneterephtalate. With additional reference to FIG. 3, an antenna 24 comprising a spiral pattern of aluminum or other good electrical conductor is formed on the surface of the inlay layer 22 which is remote from the release liner 16. Although the antenna 24 is shown as a curved spiral, other geometric shapes and conductive patterns, such as a square or rectangular spiral can be utilized, as are well known for radio frequency identification systems. The electronic circuitry for the radio frequency transponder is fabricated into an integrated circuit 26 which is attached to the remote surface of the inlay layer 22 and electrically connected to the antenna 24. The inlay layer 22, the antenna 24, and integrated circuit 26 may be obtained as a prefabricated assembly from several manufacturers. For example, Texas Instruments Incorporated of Dallas, Tex., U.S.A. produces assemblies under the Tag-it™ name, while Poly-Flex Circuits of Cranston, U.S.A. and Rafsec OY of Tampere, Finland manufacture assemblies that use the I-CODE integrated circuit produced by Koninklijke Philips Electronics N.V., Eindhoven, The Netherlands. However, other types of transponder circuits and antennas can be placed on the inlay layer 22 or otherwise incorporated into the label laminations.

As seen in FIG. 1, the hologram 14 is adhered to, laminated on, or otherwise formed on the upper surface 34 of the radio frequency transponder 12. The hologram 14 comprises a non-metallic, reflective film 36 which covers the upper surface 34 of the radio frequency transponder 12. The non-metallic film 36 reflects light away from the label 10. Non-metallic reflective material suitable for film 36 is described in U.S. Pat. No. 5,448,404. This exemplary non-metallic film is a formable multiple layer reflective polymeric body which has a substantially uniform broad bandwidth reflectance over substantially the entire range of the visible spectrum to provide a substantially uniform reflective appearance. The non-metallic, reflective film 36 includes at least first and second diverse polymeric materials and has a sufficient number of alternating layers of the first and second polymeric materials, such that at least 40% of visible light incident on the film is reflected. A substantial majority of the individual layers of the film 36 have optical thicknesses in the range where the sum of the optical thicknesses in a repeating unit of the polymeric materials is greater than about 190 nm, and the first and second polymeric materials have refractive indices which differ from each other by at least about 0.03. Another suitable multi-layer polymeric film has an outside layer of polyethylenenaphthalate (PEN) and is marketed by the Minnesota Mining and Manufacturing Company of St. Paul, Minn., U.S.A. under the name 3M® Radiant Mirror Film VM2000. These films have a high specular reflectance so as to resemble a highly reflective metal layer.

Abutting the non-metallic, reflective film 36 is a generally transparent layer 40 containing a transparent holographic image 42. Because the reflective surface provided by film 36 is non-metallic, it does not interfere with the tuning of the transponder circuitry. This avoids the need to space the hologram significant distance from that circuitry, thereby enabling the entire label 10 to have a relatively thin profile.

With the exception of a non-metallic reflective film 36, the hologram 14 is of a conventional design. For example, layer 40 is a light-transparent sheet which contains a holographic image 42 that has a viewing angle of approximately 20° to either side of a selected viewing axis. The holographic image appears and then disappears as the viewing angle changes when the label or the object to which the label is applied is being inspected.

The reflective hologram 14 provides a security function as the holographic image 42 may be adversely affected in a visible manner should someone attempt to remove the label 10 from one object and apply the label to another object. The hologram also makes counterfeiting the label more difficult. Therefore the hologram 14 with the non-metallic reflector provides a deterrent to unauthorized use of the label 10 without affecting the operation of the radio frequency transponder 12.

Alternatively in applications of a radio frequency transponder label in which the anti-counterfeiting mechanism of the hologram image is not required, the transparent layer 40 may be eliminated. In this version of the present invention, the non-metallic, reflective film 36 forms the exterior surface of the label protecting the radio frequency transponder 12. The exposed reflective film 36 also provides an attractive metallic appearance to the label.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A label for identifying an object, said label comprising:
   a radio frequency transponder having an antenna and a transponder circuit connected to the antenna, wherein the antenna and the transponder circuit are formed on an inlay layer of material;

a hologram applied to a surface of the radio frequency transponder, wherein the hologram has a non-metallic film forming a reflector of light and an image layer adjacent to the non-metallic film and containing a holographic image; and a mechanism for attaching the label to the object.

2. The label as recited in claim 1 wherein the image layer is transparent.

3. The label as recited in claim 1 wherein the mechanism for attaching the label to the object comprises adhesive applied to the inlay layer.

4. The label as recited in claim 1 wherein the antenna comprises a pattern of electrically conductive material applied to a surface of the inlay layer.

5. The label as recited in claim 1 wherein the non-metallic film of the hologram comprises a multiple layer reflective polymeric body.

6. The label as recited in claim 1 wherein the non-metallic film of the hologram comprises a multiple alternating layers of first and second polymeric materials.

7. The label as recited in claim 6 wherein the first and second polymeric materials have refractive indices which differ from each other by at least about 0.03.

8. A label for identifying an object, said label comprising:

an inlay layer of electrically non-conductive material and having opposing first and second surfaces;

an antenna formed by a pattern of electrically conductive material applied to the first surface of the inlay layer;

a transponder circuit connected to the antenna, wherein the transponder circuit and the antenna form a radio frequency transponder;

a hologram extending over the antenna and the transponder circuit, wherein the hologram includes a film, forming a non-metallic reflector of light, and an image layer adjacent to the film and containing a holographic image; and a mechanism for attaching the label to the object.

9. The label as recited in claim 8 wherein the film of the hologram comprises a multiple layer reflective polymeric body.

10. The label as recited in claim 8 wherein the film of the hologram comprises a multiple, alternating layers of first and second polymeric materials.

11. The label as recited in claim 10 wherein the first and second polymeric materials have refractive indices which differ from each other by at least about 0.03.

12. The label as recited in claim 8 wherein the hologram is attached to the first surface of the inlay layer.

13. The label as recited in claim 8 wherein the image layer of the hologram is transparent.

14. The label as recited in claim 8 wherein the mechanism for attaching the label to the object comprises adhesive applied to the second surface of the inlay layer.

15. A label for identifying an object, said label comprising:

a radio frequency transponder having an antenna and a transponder circuit connected to the antenna, wherein the antenna and the transponder circuit are formed on an inlay layer of material;

a non-metallic, reflective film abutting the radio frequency transponder and forming a reflector of light; and a mechanism for attaching the label to the object.

16. The label as recited in claim 15 further comprising an image layer adjacent to the non-metallic, reflective film and containing a holographic image.

17. The label as recited in claim 16 wherein the image layer is transparent.

18. The label as recited in claim 15 wherein the non-metallic, reflective film comprises a multiple layer reflective polymeric body.

19. The label as recited in claim 15 wherein the non-metallic, reflective film comprises a multiple alternating layers of first and second polymeric materials.

20. The label as recited in claim 19 wherein the first and second polymeric materials have refractive indices which differ from each other by at least about 0.03.

* * * * *